ial No. 615,017

United States Patent Office 2,892,955
Patented June 30, 1959

2,892,955
CERAMIC TRANSDUCERS

Leslie K. Gulton, Metuchen, N.J., assignor to Gulton Industries, Inc., Metuchen, N.J., a corporation of New Jersey No Drawing. Application October 10, 1956
Serial No. 615,017

18 Claims. (Cl. 310—8)

This invention relates to the production of improved ceramic solid solutions of lead titanate and lead zirconate which are particularly useful in piezoelectric transducers.

In Patent No. 2,708,244, dated May 10, 1955, piezoelectric transducers are disclosed in which there is utilized a ceramic element consisting of a solid solution of lead titanate and lead zirconate in which the lead titanate lies within the range of 10 to 95 mol percent, more narrowly within the range of 10 to 60 mol percent and particularly within the range of 42 to 47 mol percent, the remainder being lead zirconate. The said ceramic elements are shown to be prepared by mixing together lead oxide (PbO), zirconium oxide ($ZrO_2$), and titanium dioxide ($TiO_2$), pressing said mixture into discs or other desired shapes, heat-treating by raising the temperature gradually and then maintaining the temperature at about 1220 degrees C. (2228 degrees F.) for about 30 minutes followed by cooling. The said ceramic bodies are then provided with a pair of silver electrodes and electrically polarized at room temperature by application of a direct current field strength of 150 to 175 volts per mil for about 1 hour.

The resulting piezoelectric transducers of the aforesaid Patent No. 2,708,244 have a number of advantages over barium titanate and other transducers, as outlined in said patent. One of their important disadvantages, however, resides in their low voltage output. Thus, for instance, in the preferred embodiment of said patent, the output of said transducer was found to be 0.2 volt. This is to be contrasted with an output of 0.7 volt in the case of a conventional barium titanate transducer.

It has been found, in accordance with the present invention, that startling increases in voltage output can be obtained in transducers of the type comprising solutions of lead titanate and lead zirconate. This is accomplished through the conjoint effect of (1) utilizing red lead or $Pb_3O_4$ in place of PbO, and (2) heat treating or firing the ceramic mixture ($Pb_3O_4$, $ZrO_2$ and $TiO_2$) while maintaining the same under a pressure of at least 75 pounds per square inch and, more particularly, at a pressure in excess of 500 pounds per square inch. Depending upon the exact proportions of $Pb_3O_4$, $ZrO_2$ and $TiO_2$, the exact firing temperature, time and pressure, and upon the manner in which electrical polarization is effected, voltage outputs of 2 to 3 volts can be obtained from transducers made in accordance with the present invention.

In addition to the unusual electrical characteristics of the ceramic bodies produced in accordance with the present invention, their physical characteristics are also highly desirable from the standpoint of homogeneity, low internal stress, and high density, with a minimum of voids therein, depending upon the exact pressure utilized during the firing operation, as, for instance, less than 2% or even less than 1% of voids.

As has been pointed out above, it is important, in the practice of the present invention, to utilize lead oxide specifically in the form of $Pb_3O_4$ or red lead. It is also possible, in place of a preformed $Pb_3O_4$, to employ mixtures of PbO and $PbO_2$ in the requisite proportions to produce $Pb_3O_4$ as, for instance, 2 mols of PbO and 1 mol of $PbO_2$, whereby, in effect, $Pb_3O_4$ is produced in situ. However, this latter approach does not represent the particularly preferred embodiment of the present invention, said particularly preferred embodiment involving the use, as indicated, of preformed $Pb_3O_4$ or red lead. Mixtures of $Pb_3O_4$ and other lead oxides, particularly $PbO_2$, and especially in which the $Pb_3O_4$ constitutes of the order of at least 50% and, better still, at least 75% by weight of the lead oxide constituent of the ceramic mixture can also be employed with good results.

The essential ingredients of the ceramic mix, therefore, include $Pb_3O_4$ (or mixtures of lead oxides which, in situ, produce $Pb_3O_4$ or mixtures of $Pb_3O_4$ with other lead oxides as described), $ZrO_2$ and $TiO_2$ in requisite proportions to produce solid solutions of lead titanate and lead zirconate, particularly in molal proportions such as to produce a lead titanate content in the range of 10 to 95 mol percent. In its more limited phases, the lead titanate content falls within the range of 35 to 55 mol percent and, still more limitedly, within the range of 40 to 55 mol percent. Small proportions, generally from a fraction of 1% to about 5%, of various other oxides as, for example, tin oxides, rare earth metal oxides such as cerium oxide, samarium oxide, lanthanum oxide, yttrium trioxide, germanium oxide, rubidium oxide, thallium oxide, and mixtures thereof, and other addition agents such as lead fluoride, can be included in the ceramic mix prior to the pressure and firing treating. These added materials do not fundamentally affect various of the desired novel and significant properties of the ceramic compositions produced from the aforementioned essential ingredients, and such ceramic compositions fall within the broad scope of the teachings of the present invention. Other supplemental materials, whether oxides or other agents, in minor proportions, which do not adversely affect the desired electrical properties of the ceramic bodies of the present invention may be incorporated into the ceramic mix before the pressure and firing treatment without departing from the principles and the teachings of the present invention.

The firing of the ceramic bodies, as has been pointed out above, is carried out while maintaining said bodies under a pressure of at least 75 pounds per square inch. In the particularly preferred embodiments of the invention, however, materially higher pressures are utilized, for instance, pressures of the order of at least 300 to 500 or 750 to 850 pounds per square inch and upwards even to as high as pressures of the order of 5,000 pounds per square inch or more. The preformed ceramic bodies may be maintained under pressure in any desired manner, as, for instance, through suitable clamping plates or the like or the ceramic materials can be molded or shaped or formed as desired and, while maintained under pressure of the desired magnitude, placed into a furnace or the like to carry out the firing operation. The ceramic bodies can be produced in any desired shapes as, for instance, sheets, tubes, rods, discs, and the like, and the term "bodies" is, therefore, used herein in a generic sense to cover the ceramic products in whatever physical shape or form they may be prepared.

It will be understood that the present invention does not depend on any particular method or equipment used for applying the pressure to the ceramic materials during the firing operation. Moreover, in the application of the pressure, the same may be applied initially at room temperatures or before the furnace is brought to the desired firing temperature, or such pressure can first be applied somewhat below or at the ultimate selected firing temperature. At any rate, once the firing temperature is reached, if sufficient pressure is not already being exerted on the ceramic materials, the pressure is increased until the desired value or values are reached and firing is completed.

The firing operation is most conveniently carried out in an ordinary air atmosphere. The utilization of oxidizing atmospheres other than air as well as neutral gas atmospheres, in the firing operation, is within the scope of the invention and, by such procedures, certain variations can be obtained in the character of the final fired ceramic bodies when used in the manufacture of transducers.

The firing temperatures and times may be varied depending, among other things, upon the particular ceramic composition utilized and the exact results desired. Generally speaking, at least in most cases, firing temperatures of the order of about 1800 to about 2300 degrees F., usually 2000 to 2200 degrees F., and time periods of the order of a few minutes to a few hours, ordinarily within the range of about 20 to 45 minutes, will be found to be quite satisfactory. In general, the higher the pressure the shorter will be the period of time and lower the firing temperature to obtain a given desired result.

While, in the preferred embodiments of the invention, the ceramic materials, as described above, are admixed to form a uniform, homogeneous admixture and then subjected to forming or shaping techniques for the production of the ceramic bodies in the particular shape or form desired, it will also be understood that said ceramic mixtures may be produced in the form of pastes as, for instance, by dispersing the powdered ceramic mixture in water or an organic solvent or a vehicle or a binder. During the firing operation, the water or solvent or vehicle or binder, as the case may be, will evaporate or burn out of the ceramic material.

It should also be noted that, where the ceramic material is produced in the form of a rod, disc or shaped solid body, after being fired under pressure, as described above, said shaped solid body can be ground or otherwise disintegrated to form pulverulent particles of powders and the latter can be used to form bodies, through compression techniques with or without various binders, having interesting electrical and related properties.

The following examples are illustrative of the practice of the present invention. It will be understood that other compositions can readily be prepared, in the light of the guiding principles and teachings contained herein, and the examples are, therefore, not to be construed in any way as limitative of the full scope of the invention.

*Example 1*

(a) 1371.3 grams $Pb_3O_4$, 215.7 grams $TiO_2$, and 406.6 grams $ZrO_2$ are admixed to provide a homogeneous composition, the latter is shaped into elements having a thickness of 80 mils and a diameter of 250 mils, compressed under a pressure of 800 pounds per square inch and, while maintaining said pressure, are gradually heated to 2100 degrees F. and held at said temperature for a period of 30 minutes after which the temperature is allowed to decrease to room temperature and the pressure is then removed.

(b) Silver electrodes are applied to the elements in conventional manner and said elements are then polarized by applying a direct current potential of 170 volts per mil for a total of 14 kilovolts for a period of 60 minutes. Thereafter, the polarized elements are stabilized by a heat-cycling procedure wherein said elements are gradually heated up to about 500 degrees F. followed by gradual cooling to room temperature.

(c) The polarized elements, after the heat-cycling procedure, had an output of 3 volts (before the heat-cycling procedure, the output was 4.2 volts). The polarized elements had a density of 7.8, a resistance of 500 kilomegohms, and a capacity of 420 micro-microfarads, with less than a 1% loss.

*Example 2*

(a) 800 grams $Pb_3O_4$, 300 grams $PbO_2$, 216 grams $TiO_2$ and 406 grams $ZrO_2$ are admixed to form a homogeneous composition, the latter is shaped into discs having a thickness of 75 mils and a diameter of 225 mols, compressed under a pressure of 850 pounds per square inch and, while maintaining said pressure, are gradually heated to 2125 degrees F. and held at said temperature for a period of 30 minutes after which the temperature is allowed to decrease to room temperature and the pressure is then removed.

(b) Silver electrodes are then applied and polarization and heat-cycling are then carried out in the manner described in part (b) of Example 1.

While the invention has been described in detail, no unnecessary limitations should be read thereinto, the scope of the invention being pointed out in the appended claims.

What is claimed as new and desired to be protected by Letters Patent of the United States is:

1. A method of producing improved ceramic bodies comprising solid solutions of lead titanate and lead zirconate in which the lead titanate is present in proportions within the range of 10 to 95 mol percent, which includes preparing a mixture comprising $Pb_3O_4$, $ZrO_2$ and $TiO_2$, in requisite proportions to produce the aforesaid solid solutions of lead titanate and lead zirconate, forming said mixture into a body of desired shape, and firing said mixture at an elevated firing temperature while maintaining said mixture at a pressure of at least 75 pounds per square inch.

2. A method of producing improved ceramic bodies comprising solid solutions of lead titanate and lead zirconate in which the lead titanate is present in proportions within the range of 35 to 55 mol percent, which includes preparing a mixture comprising $Pb_3O_4$, $ZrO_2$ and $TiO_2$, in requisite proportions to produce the aforesaid solid solutions of lead titanate and lead zirconate, forming said mixture into a body of desired shape, and firing said mixture at an elevated firing temperature while maintaining said mixture at a pressure of at least 500 pounds per square inch.

3. A method of producing improved ceramic bodies comprising solid solutions of lead titanate and lead zirconate in which the lead titanate is present in proportions within the range of 40 to 50 mol percent, which includes preparing a mixture comprising $Pb_3O_4$, $ZrO_2$ and $TiO_2$, in requisite proportions to produce the aforesaid solid solutions of lead titanate and lead zirconate, forming said mixture into a body of desired shape, and firing said mixture at a temperature of about 2000 and 2200 degrees F. while maintaining said mixture at a pressure of about 750 to 850 pounds per square inch.

4. A method of producing improved ceramic bodies comprising solid solutions of lead titanate and lead zirconate in which the lead titanate is present in proportions within the range of 10 to 95 mol percent, which includes preparing a mixture comprising lead oxides containing predominately $Pb_3O_4$, $ZrO_2$ and $TiO_2$, in requisite proportions to produce the aforesaid solid solutions of lead titanate and lead zirconate, forming said mixture into a body of desired shape, and firing said mixture at an elevated firing temperature while maintaining said mixture at a pressure of at least 75 pounds per square inch.

5. A method of producing improved ceramic bodies comprising solid solutions of lead titanate and lead zirconate in which the lead titanate is present in proportions within the range of 35 to 55 mol percent, which includes preparing a mixture comprising $Pb_3O_4$ and $PbO_2$ in which the $Pb_3O_4$ constitutes not less than 50% of said lead oxides, $ZrO_2$ and $TiO_2$, in requisite proportions to produce the aforesaid solid solutions of lead titanate and lead zirconate, forming said mixture into a body of desired shape, and firing said mixture at an elevated firing temperature while maintaining said mixture at a pressure of at least 500 pounds per square inch.

6. A new and improved ceramic transducer body comprising a solid solution of lead titanate and lead zirconate in which the lead titanate is present in proportions within the range of 10 to 95 mol percent, comprising a compressed substantially homogeneous fired body of a mixture of $Pb_3O_4$, $ZrO_2$ and $TiO_2$, in requisite proportions to produce the aforesaid solid solutions of lead titanate and lead zirconate, said mixture having been subjected to a pressure of at least 75 pounds per square inch during the firing operation.

7. A new and improved ceramic transducer body comprising a solid solution of lead titanate and lead zirconate in which the lead titanate is present in proportions within the range of 35 to 55 mol percent, comprising a compressed substantially homogeneous fired body of a mixture of $Pb_3O_4$, $ZrO_2$ and $TiO_2$, in requisite proportions to produce the aforesaid solid solutions of lead titanate and lead zirconate, said mixture having been subjected to a pressure of at least 500 pounds per square inch during the firing operation.

8. A new and improved ceramic transducer body comprising a solid solution of lead titanate and lead zirconate in which the lead titanate is present in proportions within the range of 40 to 50 mol percent, comprising a compressed substantially homogeneous fired body of a mixture of $Pb_3O_4$, $ZrO_2$ and $TiO_2$, in requisite proportions to produce the aforesaid solid solutions of lead titanate and lead zirconate, said mixture having been subjected to a pressure of about 750 to 850 pounds per square inch during a firing operation of about 2000 to 2200 degrees F.

9. A new and improved ceramic transducer body comprising a solid solution of lead titanate and lead zirconate in which the lead titanate is present in proportions within the range of 10 to 95 mol percent, comprising a compressed substantially homogeneous fired body of a mixture of lead oxides containing predominately $Pb_3O_4$, $ZrO_2$ and $TiO_2$, in requisite proportions to produce the aforesaid solid solutions of lead titanate and lead zirconate, said mixture having been subjected to a pressure of about 300 to 850 pounds per square inch during the firing operation.

10. A new and improved ceramic transducer body comprising a solid solution of lead titanate and lead zirconate in which the lead titanate is present in proportions within the range of 35 to 55 mol percent, comprising a compressed substantially homogeneous fired body of a mixture of $Pb_3O_4$ and $PbO_2$ in which the $Pb_3O_4$ constitutes not less than 50% of said lead oxides, $ZrO_2$ and $TiO_2$, in requisite proportions to produce the aforesaid solid solutions of lead titanate and lead zirconate, said mixture having been subjected to a pressure of at least 300 pounds per square inch during the firing operation.

11. A new and improved ceramic transducer body comprising a solid solution of lead titanate and lead zirconate in which the lead titanate is present in proportions within the range of 10 to 95 mol percent, comprising a compressed substantially homogeneous fired body of a mixture of $ZrO_2$, $TiO_2$, and lead oxide at least mainly in the form of $Pb_3O_4$, in requisite proportions to produce the aforesaid solid solutions of lead titanate and lead zirconate, said mixture having been subjected to a pressure of at least 75 pounds per square inch during the firing operation, said transducer body having less than 2% of voids therein.

12. A piezoelectric transducer comprising a pair of electrodes and, interposed therebetween, a ceramic transducer body comprising a solid solution of lead titanate and lead zirconate in which the lead titanate is present in proportions within the range of 10 to 95 mol percent, said cerami transducer body comprising a compressed substantially homogeneous fired body of a mixture of $ZrO_2$, $TiO_2$, and lead oxide at least mainly in the form of $Pb_3O_4$, in requisite proportions to produce the aforesaid solid solutions of lead titanate and lead zirconate, said mixture having been subjected to a pressure of at least 75 pounds per square inch during the firing operation.

13. A piezoelectric transducer comprising a pair of electrodes and, interposed therebetween, a ceramic transducer body comprising a solid solution of lead titanate and lead zirconate in which the lead titanate is present in proportions within the range of 35 to 55 mol percent, said ceramic transducer body comprising a compressed substantially homogeneous fired body of a mixture of $ZrO_2$, $TiO_2$, and lead oxide at least mainly in the form of $Pb_3O_4$, in requisite proportions to produce the aforesaid solid solutions of lead titanate and lead zirconate, said mixture having been subjected to a pressure of from about 300 to about 850 pounds per square inch and a firing temperature of about 2000 to 2200 degrees F.

14. A method in accordance with claim 1, wherein there is included in the ceramic mixture, prior to forming the same into a body of desired shape and firing, from a fraction of 1% to about 5% of a rare earth metal oxide selected from the group consisting of cerium oxide, samarium oxide, lanthanum oxide, yttrium trioxide, germanium oxide, rubidium oxide, thallium oxide, and mixtures thereof.

15. A method in accordance with claim 1, wherein there is included in the ceramic mixture, prior to forming the same into a body of desired shape and firing, from a fraction of 1% to about 5% of lead fluoride.

16. A ceramic transducer body in accordance with claim 6, wherein there is included in said body, prior to forming and firing the same, from a fraction of 1% to about 5% of a rare earth metal oxide selected from the group consisting of cerium oxide, samarium oxide, lanthanum oxide, yettrium trioxide, germanium oxide, rubidium oxide, thallium oxide, and mixtures thereof.

17. A ceramic transducer body in accordance with claim 6, wherein there is included in the ceramic mixture, prior to forming the same into a body of desired shape and firing, from a fraction of 1% to about 5% of lead fluoride.

18. A piezoelectric transducer in accordance with claim 12, wherein there is included in said ceramic transducer body, prior to forming and firing the same, from a fraction of 1% to about 5% of a rare earth metal oxide selected from the group consisting of cerium oxide, samarium oxide, lanthanum oxide, yttrium trioxide, germanium oxide, rubidium oxide, thallium oxide, and mixtures thereof.

References Cited in the file of this patent

UNITED STATES PATENTS

| | | |
|---|---|---|
| 2,331,232 | Ross | Oct. 5, 1943 |
| 2,367,093 | Brown et al. | Jan. 9, 1945 |
| 2,399,082 | Wainer | Apr. 23, 1946 |
| 2,402,515 | Wainer | June 18, 1946 |
| 2,418,650 | Mackey | Apr. 8, 1947 |
| 2,533,140 | Rodriguez | Dec. 5, 1950 |
| 2,598,707 | Matthias | June 3, 1952 |
| 2,625,730 | Cremer | Jan. 20, 1953 |
| 2,689,185 | Soyck | Sept. 14, 1954 |
| 2,691,738 | Matthias | Oct. 12, 1954 |
| 2,708,244 | Jaffe | May 10, 1955 |